United States Patent
Yamada et al.

(10) Patent No.: US 9,893,600 B2
(45) Date of Patent: Feb. 13, 2018

(54) ROTATING ELECTRICAL MACHINE AND METHOD OF MOUNTING ELEMENT WIRE TEMPERATURE MEASUREMENT SENSORS ON ROTATING ELECTRICAL MACHINE

(71) Applicant: MITSUBISHI ELECTRIC CORPORATION, Chiyoda-ku, Tokyo (JP)

(72) Inventors: Takuro Yamada, Tokyo (JP); Ryutaro Kawaguchi, Tokyo (JP); Keitaro Takesaki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 247 days.

(21) Appl. No.: 14/896,838

(22) PCT Filed: May 9, 2014

(86) PCT No.: PCT/JP2014/062422
§ 371 (c)(1),
(2) Date: Dec. 8, 2015

(87) PCT Pub. No.: WO2015/170393
PCT Pub. Date: Nov. 12, 2015

(65) Prior Publication Data
US 2016/0141941 A1    May 19, 2016

(51) Int. Cl.
*H02K 11/00*    (2016.01)
*H02K 11/25*    (2016.01)
(Continued)

(52) U.S. Cl.
CPC ............... *H02K 11/25* (2016.01); *H02K 3/14* (2013.01); *H02K 3/28* (2013.01); *H02K 3/34* (2013.01); *H02K 3/38* (2013.01); *H02K 15/00* (2013.01)

(58) Field of Classification Search
CPC .......... H02K 11/25; H02K 3/28; H02K 3/345; H02K 3/34; H02K 3/38
(Continued)

(56) References Cited

U.S. PATENT DOCUMENTS 2,619,573 A * 11/1952 Dawson, Jr. ............. H02H 5/04
136/232
3,745,466 A *  7/1973 Pisano ..................... H05K 9/00
174/357

(Continued)

FOREIGN PATENT DOCUMENTS

EP    2420809 A2    2/2012
JP    53-150269 U    11/1978
(Continued)

OTHER PUBLICATIONS

The extended European Search Report dated Apr. 25, 2017, by the European Patent Office in corresponding European Application No. 14891230.6. (9 pages).
(Continued)

*Primary Examiner* — Thanh Lam
(74) *Attorney, Agent, or Firm* — Buchanan Ingersoll & Rooney PC

(57) ABSTRACT

Insulating objects arranged in parallel between adjacent element wire conductors of a plurality of the element wire conductors in a circumferential direction of the rotating electrical machine on each of both sides interposing a dislocating portion of the element wire conductor and linearly extending along the adjacent element wire conductors; a storage space formed between the linear insulating objects arranged in parallel at each of the both sides interposing the dislocating portion; and a temperature detection sensor configured to detect a temperature of the element wire conductors and stored in the storage spaces at each of the both sides interposing the dislocating portion across both
(Continued)

sides interposing the dislocating portion are provided, wherein the hardness of the insulating objects is lower than the hardness of the element wire conductors, whereby the types of the rotating electrical machine to which the temperature detection sensor can be applied may be extensively increased.

10 Claims, 10 Drawing Sheets

(51) Int. Cl.
    *H02K 3/34*     (2006.01)
    *H02K 3/28*     (2006.01)
    *H02K 3/38*     (2006.01)
    *H02K 15/00*     (2006.01)
    *H02K 3/14*     (2006.01)

(58) Field of Classification Search
    USPC ................ 310/43, 68 C, 179–184, 201–208
    See application file for complete search history.

(56) References Cited

U.S. PATENT DOCUMENTS

| | | | |
|---|---|---|---|
| 4,571,518 A * | 2/1986 | Kintz, Jr. | ............... H02K 11/25 310/68 C |
| 4,827,487 A | 5/1989 | Twerdochlib | |
| 2002/0196994 A1 | 12/2002 | Bosselmann et al. | |
| 2009/0140614 A1 * | 6/2009 | Heim | ..................... H02K 11/25 310/68 C |
| 2012/0043863 A1 | 2/2012 | Takahashi et al. | |
| 2012/0086292 A1 * | 4/2012 | Ishida | ................... H02K 11/25 310/71 |
| 2013/0156071 A1 * | 6/2013 | Wan | ....................... H02K 3/345 374/183 |
| 2014/0092938 A1 | 4/2014 | Adolf et al. | |
| 2014/0191629 A1 * | 7/2014 | Takahashi | ........... H02K 11/0047 310/68 C |

FOREIGN PATENT DOCUMENTS

| | | |
|---|---|---|
| JP | 57-183616 U | 11/1982 |
| JP | 62-161554 U | 10/1987 |
| JP | 05-137298 A | 6/1993 |
| JP | H05137298 | 6/1993 |
| JP | 08-080011 A | 3/1996 |
| JP | 2003-518905 A | 6/2003 |
| JP | 2010-158121 A | 7/2010 |
| JP | 2012-044773 A | 3/2012 |
| WO | WO 2015/171768 A2 | 12/2012 |

OTHER PUBLICATIONS

International Search Report (PCT/ISA/210) dated Jul. 22, 2014, by the Japanese Patent Office as the International Searching Authority for International Application No. PCT/JP2014/062422.

* cited by examiner

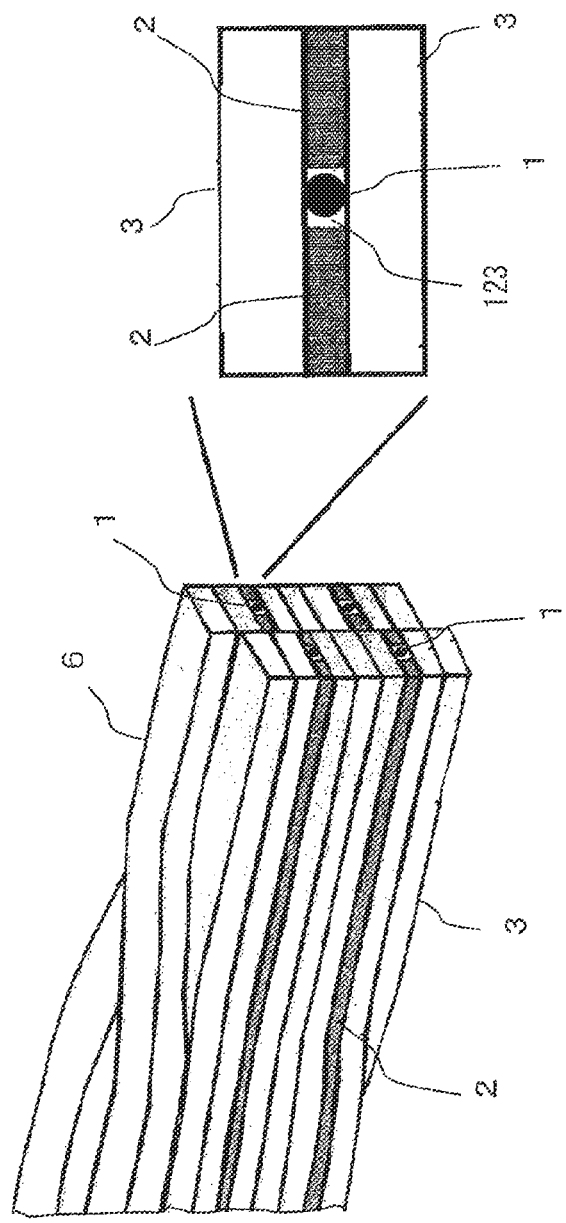

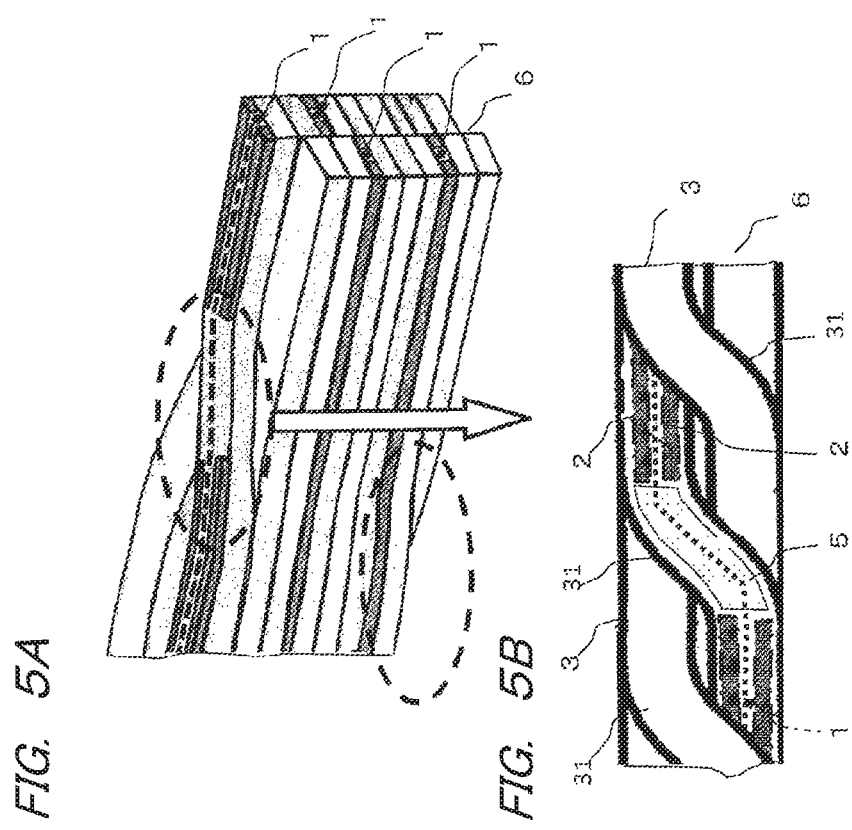

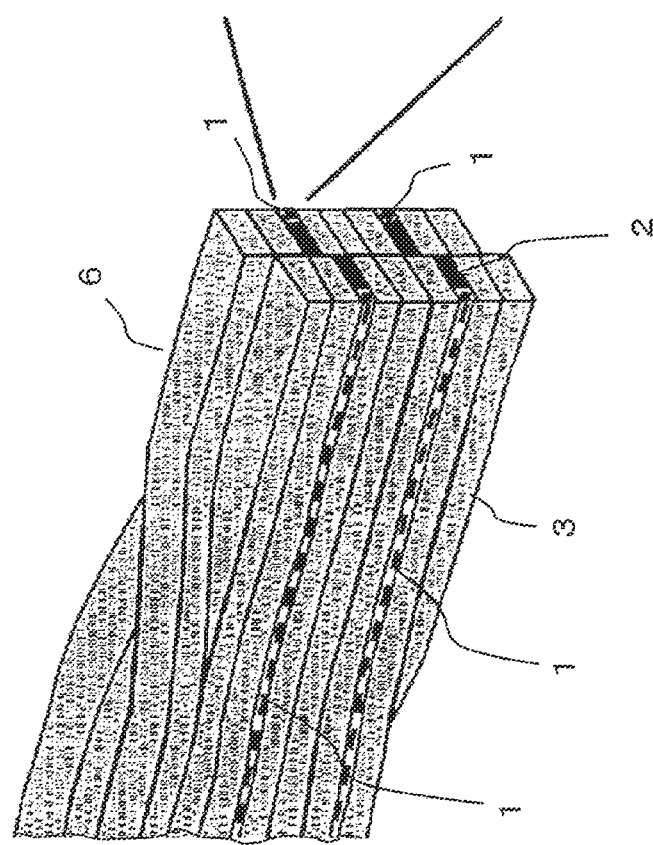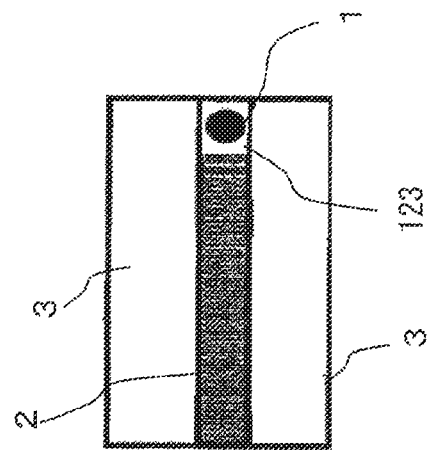

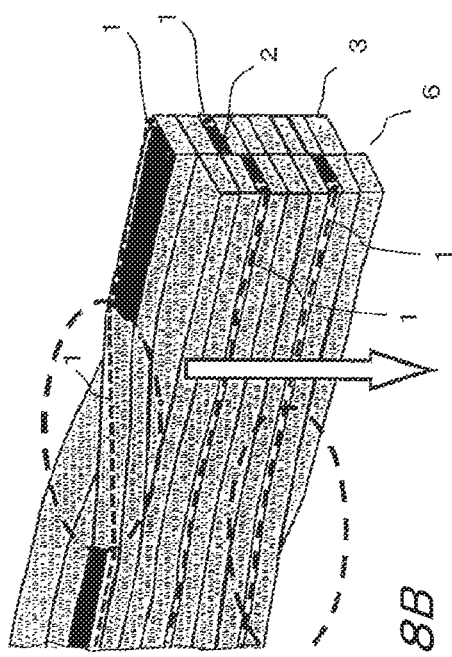
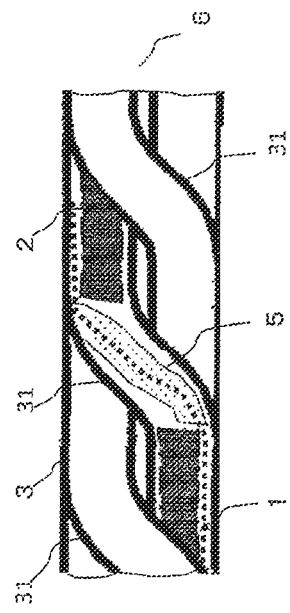
FIG. 8A
FIG. 8B

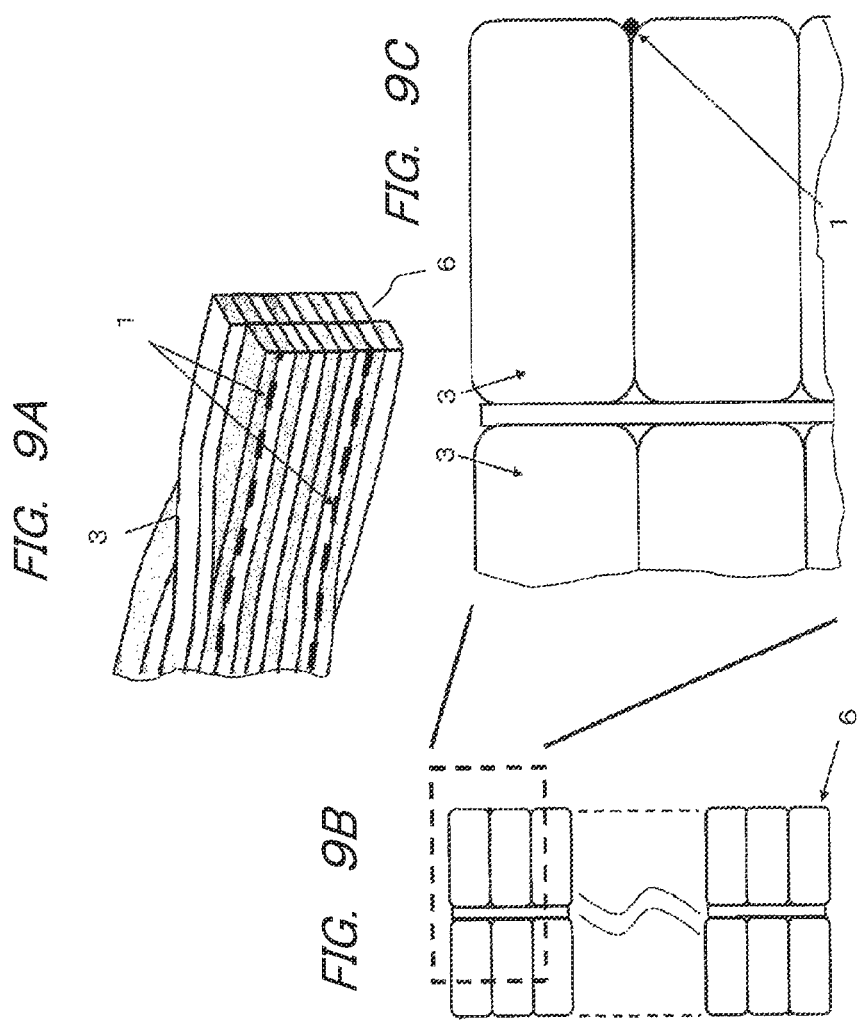

ROTATING ELECTRICAL MACHINE AND METHOD OF MOUNTING ELEMENT WIRE TEMPERATURE MEASUREMENT SENSORS ON ROTATING ELECTRICAL MACHINE

TECHNICAL FIELD

The present invention relates to a rotating electrical machine such as a turbine electric generator or the like having a coil formed of collective conductors composed of a plurality of element wire conductors formed of a rectangular conductor stacked in a radial direction of the rotating electrical machine and a method of mounting element wire temperature measurement sensors on the rotating electrical machine.

BACKGROUND ART

In a rotating electrical machine having an insulating coil formed by aggregating element wire conductors of the related art, for example, in a turbine electric generator, an element wire temperature measurement sensor is arranged at a position close to the element wire conductors provided with element wire insulation in order to measure temperatures of the element wire conductors. Also, for example, as disclosed in PTL 1, there is a method of detecting temperatures of the element wire conductors by forming a notched depressed groove or a hole in the element wire conductors.
PTL1: JP-A-2012-44773

DISCLOSURE OF INVENTION

Technical Problem

If a structure as in PTL 1 is employed in order to measure an element wire temperature of the coil formed by aggregating the element wire conductors, a thickness of the element wire conductors not smaller than a height of the element wire temperature measurement sensor needs to be secured in order to form the depressed groove or the hole, and hence there is a problem that the type of the rotating electrical machine to which the element wire temperature measurement sensor can be applied is limited such that rotating electrical machines having thin element wire conductors are not covered.

In order to solve the problem as described above, it is an object of the present invention to extensively increase types of a rotating electrical machine to which an element wire temperature measurement sensor (a temperature detection sensor configured to detect temperatures of element wire conductors) can be applied.

Solution to Problem

A rotating electrical machine of the present invention having a coil formed of collective conductors including a plurality of element wire conductors composed of rectangular conductors stacked in a radial direction of the rotating electrical machine includes: insulating objects arranged in parallel between adjacent element wire conductors of a plurality of the element wire conductors in a circumferential direction of the rotating electrical machine and extending along the adjacent element wire conductors; a storage space formed between the insulating objects arranged in parallel; and temperature detection sensors configured to detect temperatures of the element wire conductors and stored in the storage spaces, whereby types of rotating electrical machines to which the element wire temperature measurement sensors (temperature detection sensors configured to detect the temperature of the element wire conductors) can be applied are extensively increased.

A rotating electrical machine of the present invention having a coil formed of collective conductors including a plurality of element wire conductors composed of rectangular conductors stacked in a radial direction of the rotating electrical machine includes: insulating objects interposed between adjacent element wire conductors of a plurality of the element wire conductors; and temperature detection sensors configured to detect temperatures of the element wire conductors stored in storage spaces surrounded by the insulating objects and the adjacent element wire conductors, whereby types of rotating electrical machines to which the element wire temperature measurement sensors (temperature detection sensors configured to detect the temperature of the element wire conductors) can be applied are extensively increased.

A rotating electrical machine of the present invention having a coil formed of collective conductors including a plurality of element wire conductors composed of rectangular conductors stacked in a radial direction of the rotating electrical machine includes: a storage space formed at adjacent corner portions of the adjacent element wire conductors; and temperature detection sensors configured to detect temperatures of the element wire conductors and stored in the storage spaces, whereby types of rotating electrical machines to which the element wire temperature measurement sensors (temperature detection sensors configured to detect the temperature of the element wire conductors) can be applied are extensively increased.

A method of mounting an element wire temperature measurement sensor on a rotating electrical machine according to the present invention having a temperature detection sensor configured to detect the temperature of element wire conductors on a collective conductor composed of a plurality of layers of the element wire conductors formed of a rectangular conductor stacked in a radial direction of the rotating electrical machine includes: arranging insulating objects extending along one element wire on the one element wire conductor in parallel in a circumferential direction of the rotating electrical machine to form a storage space between the insulating objects arranged in parallel; storing the temperature detection sensor for detecting the temperature of the element wire conductor in the storage space; and after the storage of the temperature detection sensor, stacking another element wire conductor on the insulating objects arranged in parallel to cover the storage space with the another element wire conductors, whereby types of rotating electrical machines to which the element wire temperature measurement sensors (temperature detection sensors configured to detect the temperature of the element wire conductors) can be applied are extensively increased.

A method of mounting an element wire temperature measurement sensor on a rotating electrical machine according to the present invention having a temperature detection sensor configured to detect the temperature of element wire conductors on a collective conductor composed of a plurality of layers of the element wire conductors formed of a rectangular conductor stacked in a radial direction of the rotating electrical machine includes: stacking the insulating objects on one element wire conductor along the one element wire conductor; stacking another element wire conductors on the stacked insulating objects to form a storage space surrounded by the one element wire conductor, the insulating objects, and the other element wire conductor; and storing the temperature detection sensor in the storage space, whereby types of rotating electrical machines to which the element wire temperature measurement sensors (temperature detection sensors configured to detect the temperature of the element wire conductors) can be applied are extensively increased.

A method of mounting an element wire temperature measurement sensor on a rotating electrical machine according to the present invention having a temperature detection sensor configured to detect the temperature of element wire conductors on a collective conductor composed of a plurality of layers of the element wire conductors formed of a rectangular conductor stacked in a radial direction of the rotating electrical machine includes: stacking the plurality of layers of the element wire conductors in the radial direction of the rotating electrical machine to secure a storage space at adjacent corner portions of the adjacent element wire conductors in the course of forming the collective conductor; and storing the temperature detection sensor in the storage space, whereby types of rotating electrical machines to which the element wire temperature measurement sensors (temperature detection sensors configured to detect the temperature of the element wire conductors) can be applied are extensively increased.

Advantageous Effects of Invention

The present invention provides a rotating electrical machine having a coil formed of collective conductors which are composed of a plurality of layers of element wire conductors formed of rectangular conductors stacked in a radial direction of the rotating electrical machine, including: insulating objects arranged in parallel between adjacent element wire conductors of the plurality of element wire conductors in a circumferential direction of the rotating electrical machine and extending along the adjacent element wire conductors; a storage space formed between the insulating objects arranged in parallel; and a temperature detection sensor configured to detect temperatures of the element wire conductors and stored in the storage spaces, whereby an effect of extensively increasing types of rotating electrical machines to which the element wire temperature measurement sensors (temperature detection sensors configured to detect the temperature of the element wire conductors) can be applied is achieved.

A rotating electrical machine of the present invention having a coil formed of collective conductors including a plurality of layers of element wire conductors composed of rectangular conductors stacked in a radial direction of the rotating electrical machine includes: insulating objects interposed between adjacent element wire conductors of the plurality of the element wire conductors; and temperature detection sensors configured to detect temperatures of the element wire conductors and stored in storage spaces surrounded by the insulating objects and the adjacent element wire conductors, whereby an effect of extensively increasing types of rotating electrical machines to which the element wire temperature measurement sensors (temperature detection sensors configured to detect the temperature of the element wire conductors) can be applied is achieved.

A rotating electrical machine of the present invention having a coil formed of collective conductors including a plurality of layers of element wire conductors composed of rectangular conductors stacked in a radial direction of the rotating electrical machine includes: a storage space formed at adjacent corner portions of the adjacent element wire conductors; and a temperature detection sensor configured to detect temperatures of the element wire conductors and stored in the storage spaces, whereby an effect of extensively increasing types of rotating electrical machines to which the element wire temperature measurement sensors (temperature detection sensors configured to detect the temperature of the element wire conductors) can be applied is achieved.

A method of mounting an element wire temperature measurement sensor on a rotating electrical machine according to the present invention having a temperature detection sensor configured to detect the temperature of element wire conductors on a collective conductor composed of a plurality of layers of the element wire conductors formed of a rectangular conductor stacked in a radial direction of the rotating electrical machine, includes: arranging insulating objects extending along one element wire conductor on the one element wire conductor in parallel in a circumferential direction of the rotating electrical machine to form a storage space between the insulating objects arranged in parallel; storing the temperature detection sensor for detecting the temperature of the element wire conductor in the storage space; and after the storage of the temperature detection sensor, stacking another element wire conductor on the insulating objects arranged in parallel to cover the storage space with the another element wire conductors, whereby an effect of extensively increasing types of rotating electrical machines to which the element wire temperature measurement sensors (temperature detection sensors configured to detect the temperature of the element wire conductors) can be applied is achieved.

A method of mounting an element wire temperature measurement sensor on a rotating electrical machine according to the present invention having a temperature detection sensor configured to detect the temperature of element wire conductors on a collective conductor composed of a plurality of layers of the element wire conductors formed of a rectangular conductor stacked in a radial direction of the rotating electrical machine, includes: stacking insulating objects on one element wire conductor along the one element wire conductor; stacking another element wire conductor on the stacked insulating objects to form a storage space surrounded by the one element wire conductor, the insulating objects, and the other element wire conductor; and storing the temperature detection sensor in the storage space, whereby an effect of extensively increasing types of rotating electrical machines to which the element wire temperature measurement sensors (temperature detection sensors configured to detect the temperature of the element wire conductors) can be applied is achieved.

A method of mounting an element wire temperature measurement sensor on a rotating electrical machine according to the present invention having a temperature detection sensor configured to detect the temperature of element wire conductors on a collective conductor composed of a plurality of layers of the element wire conductors formed of a rectangular conductor stacked in a radial direction of the rotating electrical machine, includes: stacking a plurality of the element wire conductors in the radial direction of the rotating electrical machine to secure a storage space at adjacent corner portions of the adjacent element wire conductors in the course of forming the collective conductor; and storing the temperature detection sensor in the storing space, whereby an effect of extensively increasing types of rotating electrical machines to which the element wire temperature measurement sensors (temperature detection sensors configured to detect the temperature of the element wire conductors) can be applied is achieved.

BRIEF DESCRIPTION OF DRAWINGS

FIG. 1A illustrates drawings of a first embodiment of the present invention, and illustrates a perspective view of a principal portion.

FIG. 1B illustrates drawings of a first embodiment of the present invention, and illustrates a front view of a portion in a vicinity of an element wire temperature measurement sensor in an enlarged scale.

FIG. 5A illustrates drawings of the first embodiment of the present invention for exemplifying a case where a protection resin is used as the protecting insulation applied to a portion where the insulating objects are interrupted at the dislocating portion of the element wire conductors, and illustrates a perspective view.

FIG. 5B illustrates drawings of the first embodiment of the present invention for exemplifying a case where a protection resin is used as the protecting insulation applied to a portion where the insulating objects are interrupted at the dislocating portion of the element wire conductors, and illustrates a front view in an enlarged scale.

FIG. 6A illustrates drawings of a second embodiment of the present invention, and illustrates a perspective view of a principal portion.

FIG. 6B illustrates drawings of a second embodiment of the present invention, and illustrates a front view of a portion in a vicinity of an element wire temperature measurement sensor in an enlarged scale.

FIG. 8A illustrates drawings of the second embodiment of the present invention for exemplifying a case where a protection resin is used as the protecting insulation applied to a portion where the insulating object is interrupted at the dislocating portion of the element wire conductors, and illustrates a perspective view.

FIG. 8B illustrates drawings of the second embodiment of the present invention for exemplifying a case where a protection resin is used as the protecting insulation applied to a portion where the insulating object is interrupted at the dislocating portion of the element wire conductors, and illustrates a front view in an enlarged scale.

FIG. 9A illustrates drawings of a third embodiment of the present invention, and illustrates a perspective view of a principal portion.

FIG. 9B illustrates drawings of a third embodiment of the present invention, and illustrates a front view of the principal portion in an enlarged scale.

FIG. 9C illustrates drawings of a third embodiment of the present invention, and illustrates a front view of the principal portion in a further enlarged scale.

BEST MODE FOR CARRYING OUT THE INVENTION

First Embodiment

Figure 2B:
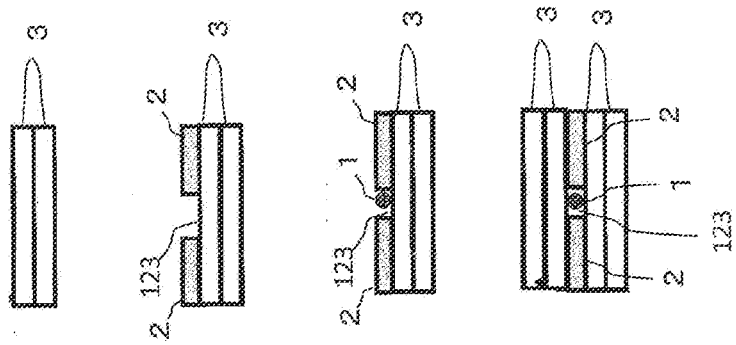
FIG. 2B illustrates drawings of the first embodiment of the present invention for exemplifying a step of mounting the element wire temperature measurement sensor, and illustrates front views.

Referring now to FIG. 1A, FIG. 1B, FIG. 2A, FIG. 2B, FIG. 3, FIG. 4A, FIG. 4B, FIG. 5A, FIG. 5B, and FIG. 10, a first embodiment of the present invention will be described.

In the first embodiment, temperature detection sensors 1 such as optical fiber temperature detection sensors, an insulating object 2, an element wire conductor 3, a protection tape 4 as protective insulation, a protection resin 5 as protective insulation, a collective conductor 6, a dislocating portion 31, and a storage space 123 are exemplified as illustrated in FIG. 1A, FIG. 1B, FIG. 2A, FIG. 2B, FIG. 3, FIG. 4A, FIG. 4B, FIG. 5A, FIG. 5B, and FIG. 10, and the embodiment exemplifies a rotating electrical machine having a coil formed of the collective conductors 6 which are composed of a plurality of layers of element wire conductors 3 formed of rectangular conductors stacked in a radial direction of the rotating electrical machine, including: insulating objects 2, 2 provided between adjacent element wire conductors 3, 3 of the plurality of the element wire conductors 3, 3, . . . , in parallel in a circumferential direction of the rotating electrical machine and extending along the adjacent element wire conductors 3, 3; the storage spaces 123 formed between the insulating objects 2, 2 arranged in parallel; and the temperature detection sensors 1 configured to detect temperatures of the element wire conductors 3, 3, . . . , and stored in the storage spaces 123.

Specifically, as illustrated in the drawing, in order to provide the storage space 123 for the temperature detection sensor 1, the insulating objects 2, 2, which are two rectangular insulating members, are arranged at a certain distance between two adjacent element wire conductors 3, 3 within a range in which a total width of the two insulating objects 2 and the space therebetween does not exceed the width of the element wire conductors 3. The storage space 123 can be formed by the insulating objects 2 irrespective of the thickness of the element wire conductors 3, so that even when the collective conductor 6 composed of a plurality of the element wire conductors 3, 3, . . . , bundled together is formed by pressure forming, a state in which an influence of pressurization on measurement values at the time of the pressure formation is avoided is achieved without causing damage of the temperature detection sensor 1.

In addition, the storage space 123 can be formed uniformly over an entire length of the insulating object 2 by the two insulating objects 2, 2.

Figure 4A:
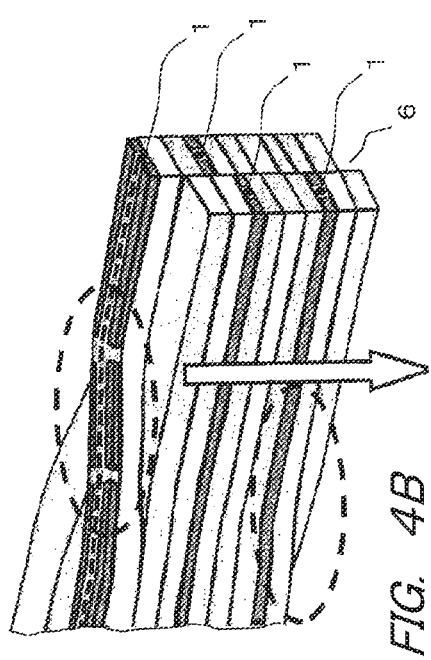
FIG. 4A illustrates drawings of the first embodiment of the present invention for exemplifying a case where a protection tape is used as a protecting insulation applied to a portion where an insulating object is interrupted at a dislocating portion of element wire conductors, and illustrates a perspective view.
Figure 4B:
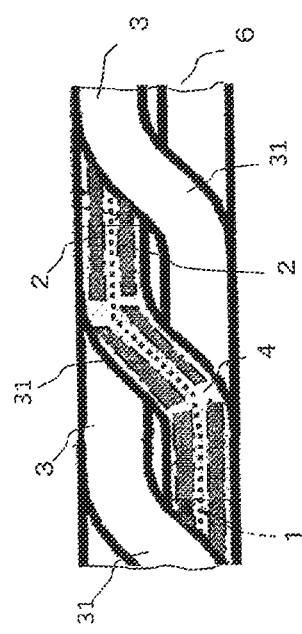
FIG. 4B illustrates drawings of the first embodiment of the present invention for exemplifying a case where a protection tape is used as a protecting insulation applied to a portion where an insulating object is interrupted at a dislocating portion of element wire conductors, and illustrates a front view in an enlarged scale.
Figures 7A, 7B:
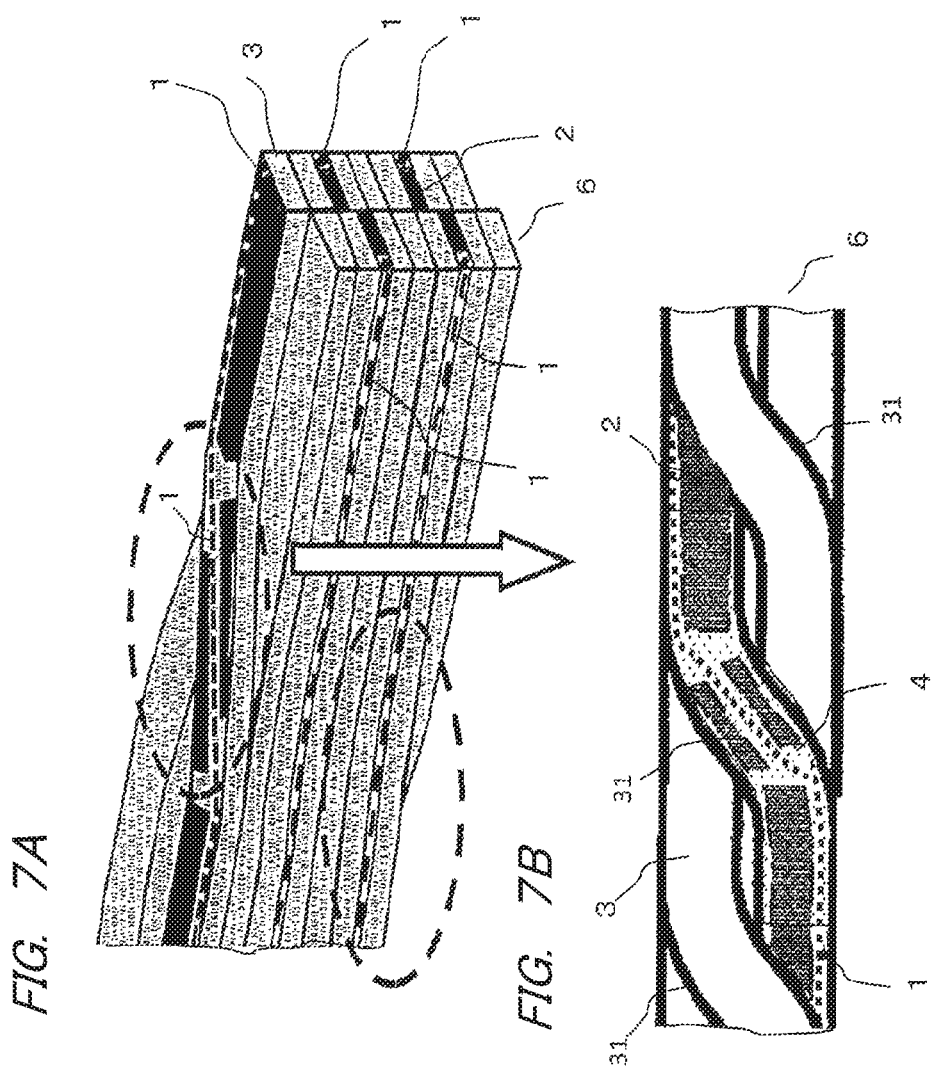
FIG. 7A illustrates drawings of the second embodiment of the present invention for exemplifying a case where a protection tape is used as a protecting insulation applied to a portion where an insulating object is interrupted at a dislocating portion of element wire conductors, and illustrates a perspective view.
FIG. 7B illustrates drawings of the second embodiment of the present invention for exemplifying a case where a protection tape is used as a protecting insulation applied to a portion where an insulating object is interrupted at a dislocating portion of element wire conductors, and illustrates a front view in an enlarged scale.

The temperature detection sensor 1 is protected by the insulating object 2 and the protection tape 4 in FIG. 4A and FIG. 4B, and by the protection resin 5 in FIG. 5A and FIG. 5B on a portion of the element wire conductors 3 on a slot bottom side or a wedge side (slot opening side) where the temperature detection sensor 1 is arranged, so that a structure which can endure during the pressure forming and during the formation of a main insulation layer after the pressure formation. A protecting insulation is applied to the dislocating portion 31 of the adjacent element wire conductors 3, 3 where the insulating objects 2, 2 are interrupted.

Figure 2A:
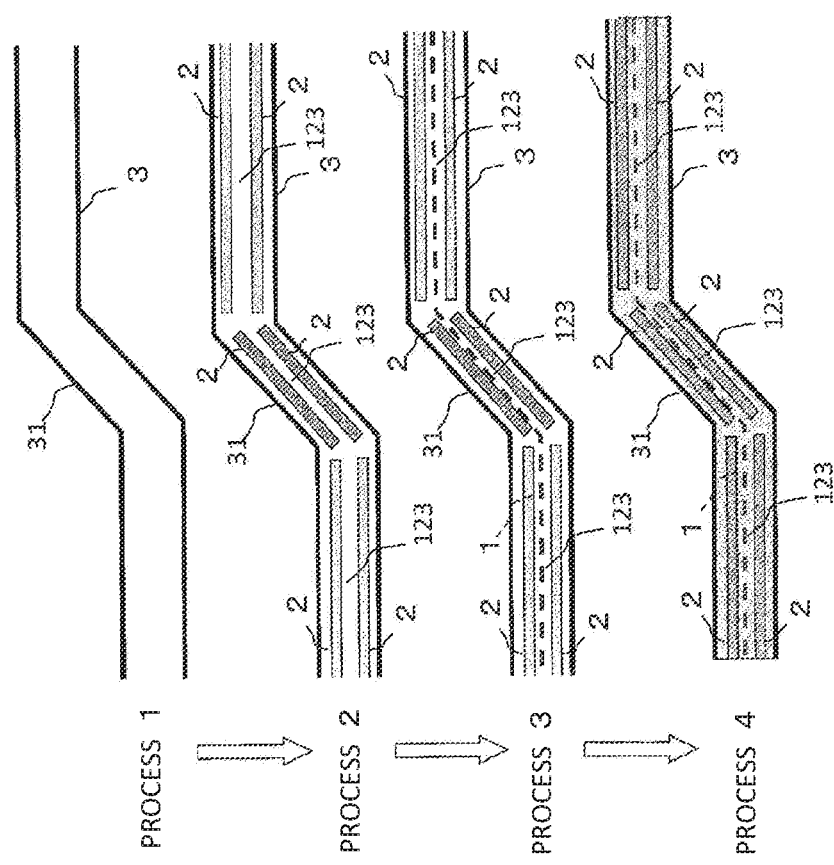
FIG. 2A illustrates drawings of the first embodiment of the present invention for exemplifying a step of mounting the element wire temperature measurement sensor, and illustrates plan views.
Figure 3:
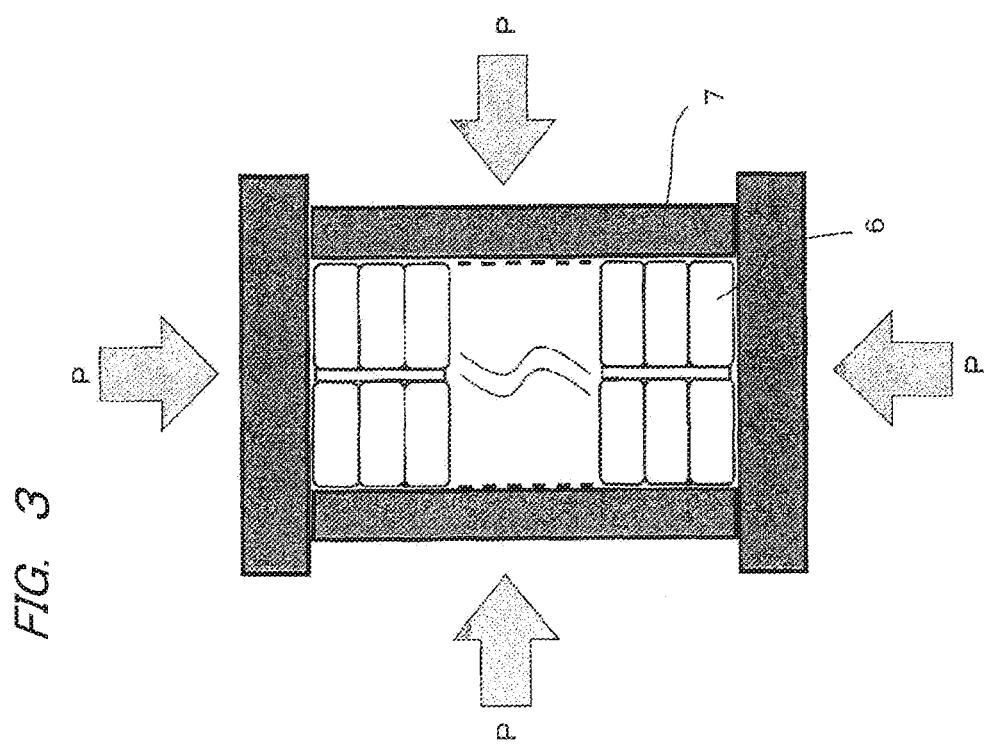
FIG. 3 is a schematic drawing illustrating the first embodiment of the present invention for explaining a pressure forming of a collective conductor in a front view.

A method of mounting the temperature detection sensors 1 on a large-sized rotating electrical machine such as a turbine electric generator, as illustrated in FIG. 2A, FIG. 2B and FIG. 3 is performed manually in the order of Step 1→Step 2→Step 3→Step 4→Step 5.

In other words, the element wire conductors 3 cut into an arbitrary length to form a dislocating portion (curved portion) are stacked by a predetermined number in Step 1, the insulating objects 2, 2 for forming the storage space 123 are located temporarily with respect to the element wire conductors 3 with an arbitrary adhesive material to form the storage space 123 in the next Step 2, and the temperature detection sensor 1 is stored in the storage space 123 in the next Step 3.

Subsequently, other element wire conductors 3 are placed on the insulating objects 2, 2 for the storage space, and stacked repeatedly until an arbitrary number of layers are formed in Step 4.

In Step 4, the collective conductors 6 are configured by stacking the arbitrary number of layers and then, the collective conductors 6 are pressure-formed into a coil shape by a metal mold 7 and then a main insulation layer (not illustrated) is formed on an outer periphery thereof in Step 5 illustrated in FIG. 3.

Figure 10:
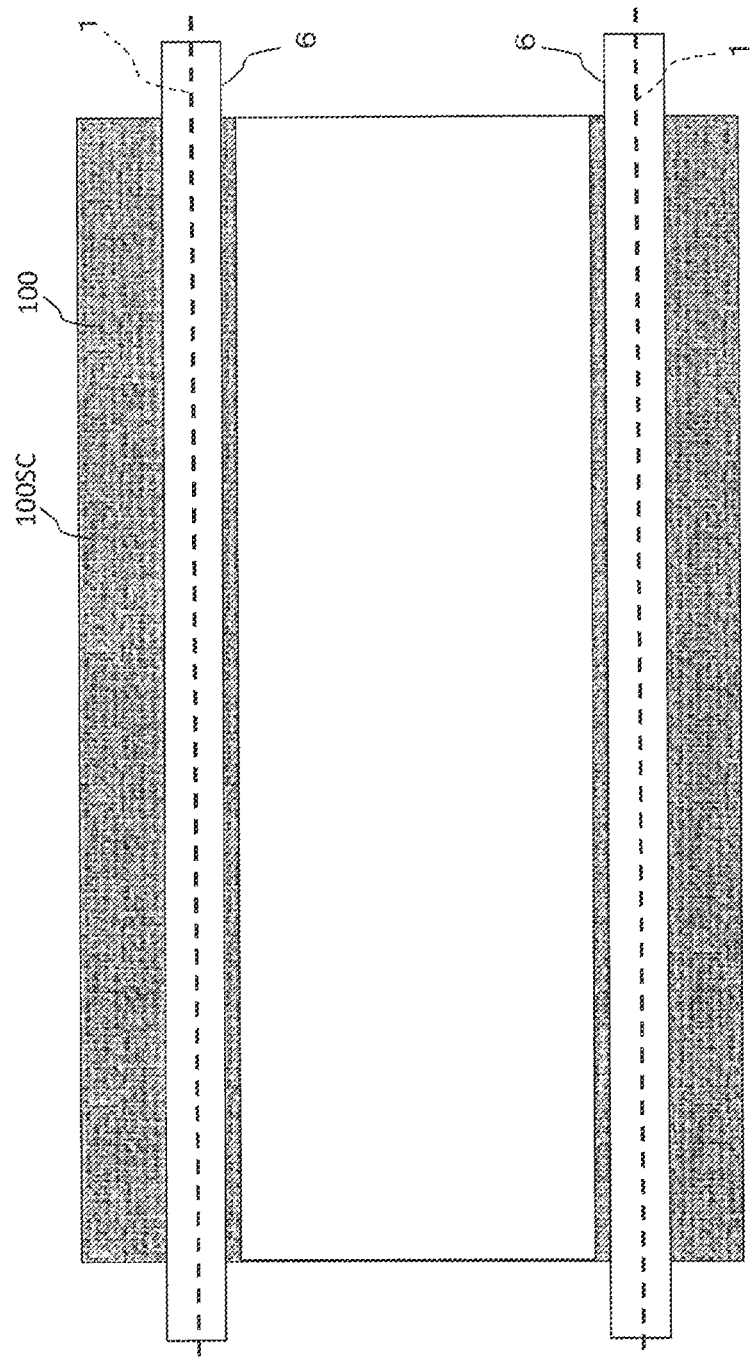
FIG. 10 is a vertical cross-sectional side view schematically illustrating a case of a stator of the rotating electrical machine to which the first to third embodiments of the present invention are applied.

In this manner, the collective conductors 6 having a desired number of the temperature detection sensors 1 mounted thereon, pressure-formed into the coil shape by the metal mold 7 and provided with the main insulation layer on the outer periphery thereof are mounted in a number of slots in a stator core 100SC of a rotating electrical machine 100 so as to be protruded from the stator core 100SC by an amount corresponding to coil ends at both ends as conceptually illustrated in FIG. 10.

In other words, in the first embodiment, the method of mounting element wire temperature measurement sensors on the rotating electrical machine having the temperature detection sensors 1 configured to detect the temperatures of the element wire conductors 3, 3, . . . , on the collective conductor 6 composed of the plurality of layers of the element wire conductors 3, 3, . . . , formed of a rectangular conductor stacked in the radial direction of the rotating electrical machine 100 including: arranging the insulating objects 2 extending along the element wire conductor on one element wire conductors 3 in parallel in the circumferential direction of the rotating electrical machine, and forming the storage space 123 opening in the radial direction of the rotating electrical machine between the insulating objects 2, 2 arranged in parallel; storing the temperature detection sensor 1 for detecting the temperature of the element wire conductor in the storage space 123; and after the storage of the temperature detection sensor 1, stacking another element wire conductor 3 on the insulating objects 2, 2 arranged in parallel to cover the storage space 123 with the another element wire conductors 3 is achieved.

In order to avoid the insulating objects 2, 2 for the storage space 123 and the element wire conductors 3, 3, . . . , from becoming damaged by the insulating objects 2, 2 themselves due to vibrations or the like, it is preferable to use the insulating objects having a hardness lower than the hardness of the element wire conductors 3, 3, . . . , to be used.

Regarding the insulating objects 2, 2 for the storage space 123, a divided block-type insulating object for the storage space 123 is arranged at the curved portion (dislocating portion), and is fixed by an arbitrary protection tape. It is also possible to avoid usage of the insulating object for the storage space 123 only in the curved portion (dislocating portion) and protect around the temperature detection sensor 1 by using a protecting insulating object such as the arbitrary protection resin or the like.

According to this embodiment, an arbitrary number of temperature detection sensors 1 may be arranged at arbitrary positions where measurement of the temperature is wanted.

Second Embodiment

Referring now to FIG. 6A, FIG. 6B, FIG. 7A, FIG. 7B, FIG. 8A and FIG. 8B, a second embodiment of the present invention will be described below.

The second embodiment exemplifies a rotating electrical machine having a coil formed of collective conductors 6 which are composed of a plurality of layers of element wire conductors 3, 3, . . . , formed of rectangular conductors stacked in a radial direction of the rotating electrical machine, including: an insulating object 2 interposed between adjacent element wire conductors 3, 3 of the plurality of the element wire conductors 3, 3, . . . ; and a temperature detection sensor 1 configured to detect temperatures of the element wire conductors stored in the storage space 123 surrounded by the insulating object 2 and the adjacent element wire conductors 3, 3.

Specifically, as illustrated in FIG. 6a and FIG. 6B, one insulating object 2 is inserted between the two element wire conductors 3, 3 within a range in which a total width of the insulating object 2 and the storage space 123 does not exceed the width of the element wire conductors 3 in order to secure the storage space 123 of the temperature detection sensor 1, and insertion of the temperature detection sensor 1 into the storage space 123 immediately before a pressing work (see FIG. 3) after the collective conductor 6 has formed by bundling a plurality of the element wire conductors 3, 3, . . . , is enabled, so that a significant improvement of workability is expected. The temperature detection sensor 1 is protected by the insulating object 2 and the protection tape 4 in FIG. 7A and FIG. 7B, and by the protection resin 5 in FIG. 8A and FIG. 8B on a portion of the element wire conductors 3 on a slot bottom side or a wedge side (slot opening side) where the temperature detection sensor 1 is arranged, so that a structure which can endure during the formation of a main insulation layer is achieved.

In other words, the method of mounting element wire temperature measurement sensors on the rotating electrical machine according to the second embodiment having the temperature detection sensor 1 configured to detect the temperatures of the element wire conductors on the collective conductor 6 composed of a plurality of layers of the element wire conductors 3, 3, . . . , formed of rectangular conductors stacked in the radial direction of the rotating electrical machine including: stacking the insulating objects 2 on one element wire conductor 3 along the one element wire conductor 3; stacking the other element wire conductor 3 on the stacked insulating object 2 to form the storage space 123 surrounded by the one element wire conductor 3, the insulating object 2 and the other element wire conductor 3 and opening in the circumferential direction of the rotating electrical machine; and storing the temperature detection sensor 1 in the storage space 123, is achieved.

Third Embodiment

Referring now to FIG. 9A, FIG. 9B and FIG. 9C, a third embodiment of the present invention will be described below.

The third embodiment exemplifies a rotating electrical machine having a coil formed of collective conductors 6 which are composed of a plurality of layers of element wire conductors 3, 3, . . . , formed of rectangular conductors stacked in a radial direction of the rotating electrical machine, including: the storage space 123 formed at adjacent corner portions of the adjacent element wire conductors 3, 3; and the temperature detection sensor 1 configured to detect the temperature of the element wire conductors and stored in the storage space 123.

Specifically, as illustrated in FIG. 9A, FIG. 9B and FIG. 9C, by rounding the corner portions of the element wire conductors 3, 3, . . . , a space formed when the element wire conductors 3, 3, . . . , are bundled to constitute the collective conductor 6 may be used as the storage space 123 for the temperature detection sensor 1.

More specifically, after arbitrary layers of the element wire conductors 3, 3, . . . , having rounded corner portions have been stacked to form the collective conductor 6, pressure forming is performed by using the metal mold (see FIG. 3). After the pressure forming into a coil shape has performed, the space formed between corner portions of the adjacent element wire conductors 3, 3 is secured as the storage space 123, the temperature detection sensor 1 is arranged in the storage space 123, and the temperature detection sensor 1 is fixed to the pressure-formed collective conductor 6 with an arbitrary protection tape or a protection resin. Subsequently, the main insulating layer is formed on the outer periphery thereof.

In this method, assembly of the temperature detection sensor 1 is enabled after having pressed in the pressing work (see FIG. 3) after the collective conductor 6 has formed by bundling a plurality of the element wire conductors 3, 3, . . . , so that a significant improvement of the work is expected and the state of installation of the temperature detection sensor 1 can be confirmed at a glance.

In other words, in the embodiment, the method of mounting element wire temperature measurement sensors on the rotating electrical machine having the temperature detection sensor 1 configured to detect the temperatures of the element wire conductors on the collective conductor 6 composed of a plurality of layers of the element wire conductors 3, 3, . . . , formed of rectangular conductors stacked in the radial direction of the rotating electrical machine, including: stacking the plurality of layers of the element wire conductors 3, 3, . . . , in the radial direction of the rotating electrical machine to secure the storage space 123 at adjacent corner portions of the adjacent element wire conductors 3, 3 in the course of forming the collective conductor 6; and storing the temperature detection sensor 1 in the storage space, is achieved.

As is apparent from the above-described description and the above-described respective drawings, Embodiments 1 to 3 have technical characteristics from A1 to A8 and from B1 to B9 given below.

Characteristic A1: A rotating electrical machine provided with an insulated winding having a main insulation layer on an outer periphery thereof by aggregating element wire conductors formed of rectangular conductors provided with an element wire insulating layer formed thereon, wherein a storage space is formed between conductors on wide surface sides of the element wire conductors provided with the element wire insulating layers via two insulating objects, and a temperature detection sensor is stored in the storage space.

Characteristic A2: A rotating electrical machine provided with an insulated winding having a main insulation layer formed on an outer periphery thereof by aggregating element wire conductors formed of rectangular conductors provided with an element wire insulating layer formed thereon, wherein a storage space is formed between conductors on the wide surface sides of the element wire conductors provided with the element wire insulating layers via one insulating object, and a temperature detection sensor is stored in the storage space.

Characteristic A3: A rotating electrical machine provided with an insulated winding having a main insulation layer formed on an outer periphery thereof by aggregating element wire conductors formed of rectangular conductors provided with an element wire insulating layer formed thereon, wherein a storage space is formed by rounding corner portions of the element wire conductors provided with the element wire insulating layers formed thereon, and a temperature detection sensor is stored in the storage space.

Characteristic A4: The rotating electrical machine according to any one of Characteristics 1 to 3, wherein the temperature detection sensor is an optical fiber temperature detection sensor.

Characteristic A5: A method of manufacturing a rotating electrical machine winding including: forming an element wire insulating layer on an element wire conductor formed of a rectangular conductor; forming a storage space between the element wire conductors via an insulating object; or forming the storage space by rounding corner portions of the element wire conductors; storing the optical fiber temperature detection sensor in the storage space; bundling and pressure-forming a plurality of the element wire conductors, and forming a main insulation layer formed thereon.

In the respective drawings, the same reference signs indicate the same or corresponding portions.

The present invention allows the respective embodiments to be modified, omitted, and combined as needed within the range of the invention.

The invention claimed is:

1. A rotating electrical machine including a coil formed of collective conductors which are composed of a plurality of layers of element wire conductors formed of rectangular conductors stacked in a radial direction of the rotating electrical machine, comprising:

insulating objects arranged in parallel between adjacent element wire conductors of a plurality of the element wire conductors in a circumferential direction of the rotating electrical machine on each of both sides interposing a dislocating portion of the element wire conductor and linearly extending along the adjacent element wire conductors; a storage space formed between the linear insulating objects arranged in parallel at each of the both sides interposing the dislocating portion; and a temperature detection sensor configured to detect a temperature of the element wire conductors and stored in the storage spaces at each of the both sides interposing the dislocating portion across both sides interposing the dislocating portion, wherein
the hardness of the insulating objects is lower than the hardness of the element wire conductors.

2. The rotating electrical machine according to claim 1, wherein the insulating objects are rectangular insulating members.

3. The rotating electrical machine according to claim 1, wherein a protecting insulation is provided on the dislocating portion of the adjacent element wire conductors at a position where the insulating object is interrupted.

4. The rotating electrical machine according to claim 1, wherein the temperature detection sensor is an optical fiber temperature detection sensor.

5. A rotating electrical machine including a coil formed of collective conductors which are composed of a plurality of layers of element wire conductors formed of rectangular conductors stacked in a radial direction of the rotating electrical machine, comprising:
  linear insulating objects arranged between adjacent element wire conductors of the plurality of the element wire conductors on each of the both sides interposing dislocating portions of the element wire conductors; and a temperature detection sensor configured to detect a temperature of the element wire conductors and stored in storage spaces surrounded by the insulating objects and the adjacent element wire conductors at each of the both sides interposing the dislocating portion across both sides interposing the dislocating portion, wherein
  the hardness of the insulating objects is lower than the hardness of the element wire conductors.

6. The rotating electrical machine according to claim 5, wherein the insulating objects are rectangular insulating members.

7. The rotating electrical machine according to claim 5, wherein a protecting insulation is provided on the dislocating portion of the adjacent element wire conductors at a position where the insulating object is interrupted.

8. The rotating electrical machine according to claim 5, wherein the temperature detection sensor is an optical fiber temperature detection sensor.

9. A method of mounting an element wire temperature measurement sensor on a rotating electrical machine having a coil formed of collective conductors which are composed of a plurality of layers of element wire conductors formed of rectangular conductors stacked in a radial direction of the rotating electrical machine, and including: insulating objects arranged in parallel between adjacent element wire conductors of a plurality of the element wire conductors in a circumferential direction of the rotating electrical machine on each of both sides interposing a dislocating portion of the element wire conductor and linearly extending along the adjacent element wire conductors; a storage space formed between the linear insulating objects arranged in parallel at each of the both sides interposing the dislocating portion; and a temperature detection sensor configured to detect a temperature of the element wire conductors and stored in the storage spaces at each of the both sides interposing the dislocating portion across both sides interposing the dislocating portion, in which the hardness of the insulating objects is lower than the hardness of the element wire conductors, comprising:
  arranging the insulating objects extending in parallel along one element wire conductor on the one element wire conductor in the circumferential direction of the rotating electrical machine and having a hardness lower than the hardness of the element wire conductors to form a storage space between the insulating objects arranged in parallel; storing the temperature detection sensor for detecting the temperature of the element wire conductor in the storage space; and after the storage of the temperature detection sensor, stacking another element wire conductor on the insulating objects arranged in parallel to cover the storage space with the other element wire conductors.

10. A method of mounting an element wire temperature measurement sensor on a rotating electrical machine having a coil formed of collective conductors which are composed of a plurality of layers of element wire conductors formed of rectangular conductors stacked in a radial direction of the rotating electrical machine, and including: linear insulating objects arranged between adjacent element wire conductors of the plurality of the element wire conductors on each of the both sides interposing dislocating portions of the element wire conductors; and a temperature detection sensor configured to detect a temperature of the element wire conductors and stored in storage spaces surrounded by the insulating objects and the adjacent element wire conductors at each of the both sides interposing the dislocating portion across both sides interposing the dislocating portion, in which the hardness of the insulating objects is lower than the hardness of the element wire conductors, comprising:
  stacking an insulating object extending on one element wire conductor along the element wire conductors and having a hardness lower than the hardness of the element wire conductors; stacking another element wire conductors on the stacked insulating object to form the storage space surrounded by the one element wire conductor, the insulating objects, and the other element wire conductor; and storing the temperature detection sensor in the storage space.

* * * * *